United States Patent Office 3,505,424
Patented Apr. 7, 1970

3,505,424
METHOD FOR THE CONTINUOUS PRODUCTION OF MONO-OLEFINS
Horst-Dieter Wulf, Marl, Germany, assignor to Chemische Werke Huls A.G., Marl, Germany
No Drawing. Filed Feb. 5, 1965, Ser. No. 430,727
Claims priority, application Germany, Feb. 8, 1964, 1,443,630
The portion of the term of the patent subsequent to Sept. 10, 1985, has been disclaimed
Int. Cl. C07c 11/00
U.S. Cl. 260—677                    6 Claims

ABSTRACT OF THE DISCLOSURE

In the production of mono-olefins from halogenated hydrocarbons, the technique of employing simultaneous fractional distillation and chemical reaction to form the olefins, and then separating the liberated HCl from the olefins at the boiling temperature of the olefins in order to obtain an olefin product having an exceedingly low chlorine concentration.

---

This invention relates to a process for the production of mono-olefins, in particular to an improved process involving the dehydrochlorination of chlorinated hydrocarbons.

As is known, paraffins and cycloparaffins can be obtained relatively easily and with a high degree of purity. To produce more economically valuable chemical compounds from these saturated hydrocarbons, it is desired, in certain cases, to introduce a single functional group into the saturated hydrocarbon. Accordingly, the introduction of an olefinic double bond into the saturated hydrocarbon has already been accomplished by various techniques. The olefinic hydrocarbons obtained in this way exhibit a number of valuable properties in comparison to the saturated hydrocarbon.

It is known, for example, to produce olefins from saturated hydrocarbons by thermal or catalytic cracking. However, during this process carbon-to-carbon chain scission occurs, thereby resulting in a mixture of unsaturated hydrocarbons of an undesirably lower molecular weight.

Another known process comprises the halogenation of saturated hydrocarbons and the ensuing catalytic dehydrohalogenation. Suitable catalysts are, inter alia, alkali metal and alkaline earth hydroxides; neutral salts, such as $MgCl_2$ and $BaCl_2$; reagents which are acidic under the reaction conditions, such as phthalic acid anhydride, carbazoles, and N-alkyl-carbazoles; silicates and aluminum hydrosilicates, including silica gels and diatomaceous earth; activated charcoal, as well as minerals of the bentenite, zeolite, or montmorillonite types; and finally catalysts of the Friedel-Crafts type, such as, for example, $SnCl_4$, $TiCl_4$, $FeCl_3$, $ZnCl_2$, or $AlCl_3$.

Despite the great number of prior art processes, no process has proven to be completely satisfactory for economic industrial production. Thus, for example, in the process according to U.S. Patent No. 2,708,210, during the dehydrochlorination of chlorinated paraffinic hydrocarbons over catalysts of the montmorillonite type, olefins are obtained having residual chlorine contents of 0.16 percent by weight, which is undesirably high for industrial purposes, as discussed in detail below. Likewise, by the method described in DAS (German published application) No. 1,093,340, during the corresponding dehydrohalogenation over iron filings, only a 95% conversion is achieved, which corresponds to a residual chlorine content of 0.3 percent by weight.

To obtain as high an over-all yield of monochloroalkanes as possible, it is necessary to employ a low degree of chlorination and to recycle unchlorinated remaining paraffin, after it has been separated in the cycle, to the chlorinating stage. Consequently, a low content of residual chlorine is desired in the dehydrochlorinating step, or else the residual paraffin which is recycled to the chlorinating step will enter the chlorinating stage with a deleterious concentration of olefins (e.g., 1.95 mol percent, if conducted by prior art processes), due to the fact that dehydrochlorination occurs during the separation of the paraffins in the distillation step following the main dehydrochlorination step. These olefins cause chlorine losses in the chlorinating stage because they lead to the formation of undesired dichloroalkanes by the addition of chlorine to the double bond, thereby not only wasting chlorine but also hydrocarbons. Additionally, such high residual chlorine contents in the final olefin product prohibit the use of such olefins for the production of primary alcohols by hydroformylation and hydrogenation, as the chlorine inactivates the catalysts.

Further deficiencies of these prior art processes are found in the isomerization and dissociation reactions accompanying the dehydrohalogenation step. As a consequence, substantial amounts of olefins are produced having a carbon structure which is different from that of the hydrocarbons used as starting materials. As was uncovered by an examination, lower hydrocarbons, such as butanes, for example, can also be existent in the reaction mixture, which hydrocarbons contaminate the by-product hydrogen halide. These contaminants make it impossible to use the by-product hydrogen halide directly, and thus economically, for other allied chemical processes, such as, for example, vinyl chloride synthesis from acetylene and hydrogen chloride.

The principal object of this invention, therefore, is to provide an improved process for the production of mono-olefins. Upon further study of the specification and claims, other objects and advantages of the present invention will become apparent.

To attain these objects, a preferably integrated process is provided for producing mono-olefins of high purity in a continuous manner. The integrated process comprises the steps of:

(A) reacting a halogen with a stream of saturated hydrocarbon molecules of 5–20 carbon atoms to a halogen content on the average of not more than 0.5 atom of halogen per mol of saturated hydrocarbon, said stream consisting essentially of a hydrocarbon fraction wherein the number of carbon atoms in substantially all of said molecules differs from one molecule to another by no more than two;

(B) passing the thus-obtained halogenated hydrocarbon stream in contact with a ferrous salt at 150–500° C. in a fractional distillation zone to dehydrohalogenate said halogenated hydrocarbon stream and form hydrogen halide and mono-olefins;

(C) condensing the thus-obtained mono-olefins at a temperature above 150° C.; and (D) separating gaseous hydrogen halide from the resultant condensed mono-olefins at substantially the condensation temperature.

With respect to step (A), any halogen can theoretically be employed, it being preferred to employ any of chlorine, bromine, or iodine—for reasons of economy, chlorine is the most preferred. The saturated hydrocarbon includes n-alkanes, iso-alkanes, and cyclo-alkanes, all of 5–20 carbon atoms.

When the hydrocarbon fraction which is employed as the starting material contains molecules having no more than about 10 carbon atoms, it is preferred that the difference in the number of carbon atoms from one molecule to another within said fraction be no more than one carbon atom. The latter is, of course, the preferred range, whereas the process is operable when the difference is two carbon atoms. In this connection, it is appreciated that it is economically impossible to obtain absolutely clean cuts, but it is to be noted that concentrations of shorter or longer molecules, below about 2%, do not substantially affect the process, such cuts being of course obtainable by fractional distillation.

The degree of halogenation of the hydrocarbon is preferably 0.2–0.4 atom of halogen per mol of hydrocarbon. The resultant halogenated products all have a higher boiling point than either the hydrocarbons themselves or the mono-olefins which are obtained therefrom in the dehydrohalogenation step. If desired, the halogenated hydrocarbons can be concentrated either by distilling or freezing out the excess saturated hydrocarbons from the mixture.

With respect to step (B), the dehydrohalogenation step, it is preferred that the reaction take place at 180–350° C. As stated previously, the reaction is conducted in a fractional distillation zone. Although it is possible that this zone is within a conventional plate column, it is preferred that the zone is within a packed column. In this manner, the packing can act both as a catalyst and as the necessary contact area for mass transfer in the distillation process.

The catalyst can be any ferrous salt, per se, or in combination with metallic iron, said ferrous salt being any of Fe(II)chloride, Fe(II)bromide, Fe(II)sulfate, Fe(II) acetate, Fe(II)-formiate, the anion being of no consequence.

It is highly preferred that the ferrous salt be coated on the packing in one manner or another.

Catalyst carriers are suitably porous packing such as earthenware rings and bricks, or coke particles, all of which are saturated with a solution of ferrous salts, for example. The catalyst is particularly advantageously produced by treating iron packing, such as Raschig rings, with an acid which reacts with the iron to produce ferrous salts, such acids being acetic acid, or a hydrohalic acid in any concentrations.

In case of sulfuric acid concentrations should be below 70% to avoid oxidation to Fe(III).

The dehydrohalogenation is conducted at a pressure at which the boiling point of the olefins to be produced lies above 150° C., in order to get a liquid reflux of olefin for return to the top of the fractionation zone.

With respect to step (C), the purpose of condensing and separating the mono-olefins from the by-product hydrogen halide gas at a temperature above 150° C., preferably this temperature being the boiling point under the pressure used, is to avoid solution of hydrogen halide in the condensed olefin.

At the bottom or sump of the column, by-products are removed, which by-products are predominantly olefins having twice the number of carbon atoms of the starting material. This stream can be treated, again by fractional distillation, to recover residual amounts of the desired mono-olefins.

The mono-olefins obtained in accordance with the present method are distinguished by their exceedingly small content of impurities in the form of isomerization products and halogenated hydrocarbons; thus, they exhibit a very high degree of purity. They are eminently suitable as solvents for natural and synthetic resins.

It is to be appreciated that the integrated process disclosed above yields the best results. However, it is to be understood that all of the novel and unobvious features of this integrated process contribute to its success and are to be considered individual inventive concepts in themselves.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

A cut of $C_{10}$–$C_{13}$ predominantly straight-chained paraffins is further separated by fractional distillation in a column having 50 plates, into an overhead $C_{10}$–$C_{11}$ paraffin fraction having the following composition, as determined by gas chromatography:

| $C_9$, percent | | $C_{10}$, percent | | $C_{11}$, percent | | $C_{12}$, percent | | Total, percent | n-Hydrocarbon |
|---|---|---|---|---|---|---|---|---|---|
| iso- | n- | iso- | n- | iso- | n- | iso- | n- | iso- | |
| ------ | 0.3 | 0.2 | 41.0 | 3.0 | 55.0 | 0.4 | ------ | 3.6 | 96.3 | and a $C_{12}$–$C_{13}$ bottoms fraction of the following composition:

| $C_{10}$, percent | | $C_{11}$, percent | | $C_{12}$, percent | | $C_{13}$, percent | | $C_{14}$, percent | | Total, percent | n-Hydrocarbon |
|---|---|---|---|---|---|---|---|---|---|---|---|
| iso- | n- | iso- | n- | iso- | n- | iso- | n- | iso- | n- | n- | |
| ---------- | 0.1 | ------ | 0.3 | 0.3 | 35.0 | 3.0 | 61.0 | 0.3 | 0.1 | 3.6 | 96.5 |

1200 parts by weight of the $C_{10}$–$C_{11}$ paraffin fraction are continuously chlorinated in a lead-lined chlorinating tower until the chlorine content of the fraction reaches 6.6 percent by weight on the average based on the chlorinated mass, corresponding to an average chlorination of 0.325 atom of chlorine per mol of hydrocarbon. The chlorinated fraction thereupon overflows into a receiver, wherefrom it is pumped into a Raschig column of 800 mm. diameter at a point about one third way up the column. The Raschig column is filled with iron Raschig rings 35 x 35 mm., coated with a layer of ferrous chloride previously applied by conducting hydrogen chloride over the rings at 200–250° C. for two hours.

At the head of the Raschig column, 1110 parts by weight per hour of an olefin-paraffin mixture are cooled to 250° C. and at 3.5 atmospheres gage, by water evaporating at 20 atmospheres gage. The condensed mixture is then withdrawn and fed to a tank via an aftercooler. An additional 2500 parts by weight of hot-condensed olefin-paraffin mixture are refluxed in the Raschig column. From the bottoms liquid of the Raschig column, which liquid is heated to 300° C. by means of a forced-circulation evaporator, about 10 parts by weight of olefins ($C_{20}$–$C_{22}$) and higher boiling materials are obtained per hour.

The hydrogen chloride leaving the condenser is passed to a gas cooler and cooled to 30° C. The portions of the olefin-paraffin mixture which were carried along by virtue of their partial pressure are separated by condensation during this cooling process and are recycled to the lower third of the Raschig column. The removed hydrogen chloride is absorbed in water and examined for impurities that might have been carried along, this being done by analysis of the excess residual gas by mass-spectrometry, the following data being obtained:

Impurities in hydrogen chloride stream from dehydrochlorination of $C_{10}$–$C_{11}$ paraffin fraction:

Percent by weight
Hydrogen _____ 0.043
Methane _____ 0.008
Ethylene _____ 0.023
Ethane _____ 0.017

|  | Percent by weight |
|---|---|
| Propylene | 0.034 |
| Propane | 0.012 |
| Butylene | 0.003 |
| Butane | 0.015 |
| Total impurities | 0.155 |

The obtained mono-olefin-paraffin mixture has a residual chlorine content of 22 p.p.m. This mixture, after hydrogenation over Raney nickel, shows the following composition which is determined by gas chromatography:

| $C_9$, percent | | $C_{10}$, percent | | $C_{11}$, percent | | $C_{12}$, percent | | Total, percent | |
|---|---|---|---|---|---|---|---|---|---|
| iso- | n- | iso- | n- | iso- | n- | iso- | n- | iso- | n-Hydrocarbon |
|  | 0.4 | 0.3 | 41.0 |  | 3.2 | 54.7 | 0.3 | 3.8 | 96.1 |

Thus, for all practical purposes, isomerization of the n-paraffins and olefins does not take place during the dehydrochlorination step of this invention.

EXAMPLE 2

1300 parts by weight of the $C_{12}$–$C_{13}$ fraction obtained during the separation of the $C_{10}$–$C_{13}$ paraffin mixture are chlorinated continuously to an average chlorine content of 6.2 percent by weight, corresponding to a degree of reaction of about 0.335 atom chlorine per mol of hydrocarbon. Thereafter, the chlorinated fraction is pumped into a Raschig column which is filled with earthenware rings of 50 x 50 mm. The rings have been previously provided with a coating of anhydrous ferrous chloride by spraying with a concentrated solution of ferrous chloride and subsequent drying by boiling out with the $C_{12}$–$C_{13}$ paraffin fraction.

The Raschig column is heated by a forced-circulation evaporator in such a manner that, at the head of the column, at 245° C. and 1 atmosphere gage, 1205 parts by weight of olefin-paraffin mixture $C_{12}$–$C_{13}$ can be obtained per hour, with 3-fold reflux from the hot condenser, this olefin-paraffin mixture being in the boiling state. The mono-olefin-paraffin mixture has a residual chlorine content of 17 p.p.m. From the bottoms liquid 12 parts by weight (=0.9% of the initial quantity of higher-boiling materials) are obtained at 300° C.

For purposes of comparison, a mixture of $C_{12}$–$C_{13}$ paraffins, the composition of which can be seen from the following table, is chlorinated up to a chlorine content of 6.9 percent by weight. Three hundred parts by weight portions of this partially chlorinated product are stirred and heated to 225° C., respectively, with catalysts known from the prior art, such as, for example, 1.5 part by weight of iron(III)-chloride, 30 parts by weight of "K10" catalyst (aluminum hydrosilicate), and 30 parts by weight of "Tonsil" (aluminum hydrosilicate of the fullers earth-type).

The heating process is continued until there is no further separation of hydrogen chloride. Subsequently, after the catalyst has been filtered off, the thus-obtained hydrocarbon mixtures are distilled.

The following quantities of unwanted higher-boiling substances are obtained, respectively:

Using iron(III)-choride, 7 parts by weight=2.33% of the initial charge;
Using "K10," 40 parts by weight=13.3% of the initial charge;
Using "Tonsil," 46 parts by weight=15.3% of the initial charge.

For converting the produced olefins into paraffins, the distillates are thereupon hydrogenated over Raney nickel, and the thus-obtained paraffin mixtures are examined as to their composition by gas chromatography. The results are listed in the following table and are compared with the composition of the starting paraffin.

|  | $C_{11}$, percent | | $C_{12}$, percent | | $C_{13}$, percent | | $C_{14}$, percent | | Total, percent | |
|---|---|---|---|---|---|---|---|---|---|---|
|  | iso- | n- | iso- | n- | iso- | n- | iso- | n- | iso- | n-Hydrocarbon |
| Starting paraffin | | 0.32 | 0.1 | 39.0 | 4.0 | 57.0 | 0.3 | 0.02 | 4.4 | 96.34 |
| Iron (III) chloride | 9.0 | 0.2 | 0.3 | 47.0 | 4.4 | 39.0 | | | 13.7 | 86.20 |
| "K10" catalyst | 7.0 | | | 38.0 | 7.0 | 48.0 | 0.1 | | 14.1 | 86.0 |
| "Tonsil" | 6.0 | | | 36.0 | 6.0 | 52.0 | 0.3 | | 12.3 | 88.0 |

Thus, in contradistinction to the process according to this invention, a substantial isomerization, as well as an extensive degradation of the carbon chain occurs when using the three known catalysts.

EXAMPLE 3

Blast furnace coke which has been reduced to a particle size of 10 to 15 mm. by crushing and sifting is saturated with a concentrated aqueous solution of ferrous chloride, dried in a nitrogen atmosphere, and fed into a 3 meter column of 150 mm. diameter, this column being provided at its lower end with a forced-circulation evaporator.

At the midpoint of the column, 620 parts by weight of cyclohexyl chloride are fed per hour, via a distributor. The bottoms liquid is kept at a temperature of 240° C. by the forced-circulation evaporator. At the head of the column, 428 parts by weight of cyclohexene per hour are condensed at 180° C. and 9 atmospheres gage and withdrawn from the condenser, said condenser being cooled by water evaporating under pressure. Additionally, about 500 parts by weight of cyclohexene which pass uncondensed through the condenser together with the by-product hydrogen chloride are condensed in an after-condenser, which latter condenser is kept at 30° C. The 500 parts of cyclohexene are then separated from the hydrogen chloride and fed back to the head of the column as reflux.

The theoretical yield of cyclohexene amounts to 99.7%, with a residual chlorine content of 10 p.p.m. The produced hydrogen chloride has a purity of more than 99.9%. Impurities which can be determined by mass-spectrometry are 0.006% hydrogen and 0.005% butenes.

As a comparison, according to the process disclosed in German Patent No. 1,026,308, 100 parts by weight of the commercially solid catalyst "K10" (aluminum hydrosilicate) is suspended in 500 parts by weight of motor oil. The mixture is heated to 250° C. in a stirrer flask having a Raschig column connected to its top. To this mixture are added within one hour 150 parts by weight of mono-chlorocyclohexane (gas chromatography analysis: 99.7% mono-chlorocyclohexane and 0.3% cyclohexane) through a pipe leading to the bottom of the stirring vessel. At the head of the Raschig column, 59 parts by weight of distillate are removed. The weight of the motor oil increases by approximately 45 parts by weight due to the deleterious formation of substances which are higher-boiling than mono-chlorocyclohexane. 43 parts by weight of hydrogen chloride were recovered by absorption in water, and the excess residual gas was analyzed. The results are reported in the table below and compared with the results obtained by dehydrochlorination according to the present invention.

| Distillate | Process of the invention—catalyst, ferrous chloride, percent by weight | Comparison catalyst "K10", percent by weight |
| --- | --- | --- |
| Cyclohexane | 99.7 | 44.1 |
| Cyclohexane | 0.3 | |
| Fore-run | | 0.3 |
| Methyl cyclopentane | | 24.3 |
| 1-methylcyclopentene | | 10.1 |
| Intermediate run | | 0.5 |
| 1-chloro-1-methylcyclopentane | | 19.5 |
| Cyclohexylchloride | | 0.3 |
| After-run | | 0.9 |

| Hydrogen chloride | Process of the invention—catalyst, ferrous chloride, percent by weight | Comparison catalyst "K10", percent by weight |
| --- | --- | --- |
| Hydrogen | 0.006 | |
| Butene | 0.005 | |
| Butane | | 0.29 |
| Hydrogen chloride | (¹) | (¹) |
| Total impurities | 0.011 | 0.29 |

¹ Remainder, completing 100%.

EXAMPLE 4

Iron Raschig rings of 15 x 15 mm. are filled into a Raschig column of 150 mm. diameter and are attacked for 10 minutes by the introduction of dilute acetic acid, thereby producing a surface coating of ferrous acetate. After removal of the acetic acid, a warm nitrogen stream is conducted through the column until the Raschig rings are dry.

Subsequently, at normal pressure, 2000 parts by weight per hour of a mixture of cyclododecane and cyclododecyl chloride are gradually added, this mixture having a chlorine content of 7.45 percent by weight, achieved by chlorination of cyclododecane. The sump liquid of the Raschig column is heated to 300° C. by means of a forced-circulation evaporator. During this process, there is obtained in the condenser of the Raschig column (said condenser being cooled with evaporating n-dodecane) a mixture of cyclododecene and cyclododecane at normal pressure and at a maximum temperature of 242° C. Of this latter mixture, 1832 parts by weight per hour are removed in boiling condition, and a further 5500 parts by weight per hour are recycled to the head of the column as reflux.

From the sump liquid, 14 parts by weight per hour of higher-boiling substances can be obtained, from which substances is crystallized a hydrocarbon which has a molecular weight of 320 and a melting point of 117.9° C.

An analysis of the head product by gas chromatography yields the following results:

| | Percent |
| --- | --- |
| Cyclododecane | 67.3 |
| Cis-cyclododecene | 9.4 |
| Trans-cyclododecene | 18.6 |
| Cyclododecadienes | 4.5 |

Isomerization and ring-contraction products cannot be proven to exist.

The residual chlorine content of the cyclododecene-cyclododecane mixture is less than 1 p.p.m.

The preceding examples can be repeated, with similar success, by merely substituting the specifically and generically described starting materials and operating conditions of this invention.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A continuous process for producing mono-olefins, which process comprises the steps of:
   (A) continuously passing a halogenated hydrocarbon stream in contact with a ferrous salt at 150–500° C. in a fractional distillation zone to dehydrohalogenate said halogenated hydrocarbon stream and form hydrogen halide and mono-olefins, said halogenated hydrocarbon stream being saturated hydrocarbon molecules of 5–20 carbon atoms halogenated to a halogen content on the average of not more than 0.5 atom of halogen per mol of saturated hydrocarbon, said stream consisting essentially of a hydrocarbon fraction wherein the number of carbon atoms in substantially all of said molecules differs from one molecule to another by not more than two;
   (B) continuously condensing the thus-obtained mono-olefins at a temperature above 150° C.; and
   (C) continuously separating gaseous hydrogen halide from the resultant condensed mono-olefins at the boiling temperature, whereby very low concentrations of halogen remain in the resultant separated mono-olefins.

2. The process of claim 1 wherein the halogen is chlorine.

3. The process of claim 1 wherein step (A) is conducted at 180–350° C.

4. In a continuous process of producing mono-olefins which are condensible at a temperature above 150° C., comprising the dehydrohalogenation of a halogenated hydrocarbon at a temperature of 150–500° C., the improvement which comprises condensing mono-olefin product resulting from said dehydrohalogenation at a temperature higher than 150° C., and separating gaseous hydrogen halide from the resultant condensed mono-olefins at the boiling temperature, whereby very low concentrations of halogen remain in the resultant separated mono-olefins.

5. A process as defined by claim 4 wherein the halogen to hydrocarbon ratio in the halogenated hydrocarbon is 0.2 to 0.4 atom halogen per mol of hydrocarbon.

6. A process as defined by claim 1 wherein the halogen to hydrocarbon ratio is 0.2 to 0.4 atom halogen per mol of hydrocarbon.

References Cited

UNITED STATES PATENTS

| | | | |
| --- | --- | --- | --- |
| 2,658,090 | 11/1953 | Geiser et al. | 260—683 |
| 3,401,206 | 9/1968 | Wulf et al. | 260—666 |
| 2,065,323 | 12/1936 | Thomas et al. | 260—677 |
| 2,490,973 | 12/1949 | Leonard et al. | 260—666 |
| 3,056,844 | 10/1962 | Stumpf | 260—666 |
| 3,277,205 | 10/1966 | Hughes | 260—677 |

DELBERT E. GANTZ, Primary Examiner

C. E. SPRESSER, Jr., Assistant Examiner

U.S. Cl. X.R.

260—666, 683